United States Patent
Bogess

(10) Patent No.: US 7,100,323 B1
(45) Date of Patent: Sep. 5, 2006

(54) LIGHT STICK HOLDING DEVICE FOR A FISHING FLOAT

(76) Inventor: Ricardo D. Bogess, 3136 Chaffin Rd., Blanchester, OH (US) 45102

( * ) Notice: Subject to any disclaimer, the term of this patent is extended or adjusted under 35 U.S.C. 154(b) by 0 days.

(21) Appl. No.: 11/064,210

(22) Filed: Feb. 23, 2005

(51) Int. Cl.
  A01K 75/02 (2006.01)
  A01K 93/00 (2006.01)
  A01K 97/12 (2006.01)

(52) U.S. Cl. .................. 43/17.5; 43/17.6; 43/44.87; 43/44.88; 43/44.89; 248/229.26; 248/311.2; 248/313; 24/339

(58) Field of Classification Search ........... 248/229.26; 43/17.5, 17.6, 44.87, 44.88, 44.89, 44.9, 43/44.91; A01K 75/02, 93/00, 97/12
See application file for complete search history.

(56) References Cited

U.S. PATENT DOCUMENTS

| | | | |
|---|---|---|---|
| 1,044,772 A | | 11/1912 | Gilbough |
| 1,268,622 A | | 6/1918 | Reynolds |
| 1,282,511 A | * | 10/1918 | Williams et al. ......... 220/23.83 |
| 2,191,782 A | * | 2/1940 | Valane .................. 248/229.26 |
| 2,485,087 A | * | 10/1949 | Diamond .................... 43/17.5 |
| 2,490,669 A | | 12/1949 | Burke |
| 3,105,233 A | * | 9/1963 | D Amore et al. ....... 340/815.69 |
| 3,370,376 A | * | 2/1968 | Winn ........................ 43/44.88 |
| 3,559,224 A | * | 2/1971 | Shimizu ...................... 441/17 |
| 3,576,987 A | | 5/1971 | Ridgefield et al. |
| 3,630,195 A | | 12/1971 | Santomieri |
| 3,694,951 A | * | 10/1972 | Modeme ..................... 43/41.2 |
| 3,798,822 A | * | 3/1974 | Lampus ...................... 43/17.5 |
| 3,907,239 A | * | 9/1975 | Ehrlich ................. 248/229.26 |
| 4,002,349 A | * | 1/1977 | Dopp .......................... 280/814 |
| 4,291,484 A | | 9/1981 | Young |
| 4,407,472 A | * | 10/1983 | Beck ............................ 248/89 |
| D272,802 S | | 2/1984 | Dall-Winther |
| 4,458,439 A | * | 7/1984 | Garrett, Sr. .................. 43/17.6 |
| D281,393 S | | 11/1985 | Karnhag et al. |
| 4,730,409 A | | 3/1988 | Mitchell et al. |
| 4,757,635 A | * | 7/1988 | Cole ......................... 43/44.88 |
| D298,739 S | | 11/1988 | Richards, Jr. |
| 4,827,655 A | * | 5/1989 | Reed ........................... 43/17.5 |
| D326,927 S | * | 6/1992 | Catalina .................... D26/138 |
| 5,119,578 A | * | 6/1992 | Johnson ......................... 43/17 |
| 5,137,243 A | | 8/1992 | Stevens et al. |
| 5,159,774 A | * | 11/1992 | Bennis et al. ................. 43/17.5 |
| 5,199,205 A | * | 4/1993 | Klammer ........................ 43/17 |
| 5,213,405 A | * | 5/1993 | Giglia .......................... 362/34 |
| 5,642,557 A | | 7/1997 | Clews |
| D394,801 S | | 6/1998 | Blocher |
| 5,855,084 A | | 1/1999 | Huddleston et al. |

(Continued)

Primary Examiner—Darren W. Ark
Assistant Examiner—John D. Holman
(74) Attorney, Agent, or Firm—Ronald J. Richter; Hasse & Nesbitt LLC

(57) ABSTRACT

A lightweight holding device for releasably attaching a chemiluminescent light stick to a fishing float is disclosed. The device includes a first side for releasably attaching to the fishing float, and a second side for releasably holding a chemiluminescent light stick. The first side typically includes two pairs of gripping arms, one at the top and one at the bottom, which are able to releasably receive a portion of the fishing float. The second side typically includes two pedestals, one at the top and one at the bottom, each of which are able to releasably receive an end of the light stick. The top pedestal typically defines a ceiling pocket, and the bottom pedestal a floor pocket, for one of the ends of the light stick to fit into. The first and second sides are typically integrally formed and oriented to face away from one another.

14 Claims, 5 Drawing Sheets

U.S. PATENT DOCUMENTS

| | | | |
|---|---|---|---|
| 5,915,941 A * | 6/1999 | Casey | 43/17.5 |
| 5,974,721 A * | 11/1999 | Johnson et al. | 43/17.6 |
| D440,005 S | 4/2001 | Blanton | |
| 6,425,200 B1 | 7/2002 | Bennis | |
| 6,571,506 B1 * | 6/2003 | Hunsinger | 43/17.5 |
| 6,671,994 B1 * | 1/2004 | Klein | 43/17 |
| 2003/0066229 A1 * | 4/2003 | Chu | 43/17.5 |
| 2005/0155272 A1 * | 7/2005 | Liu | 43/17.5 |

* cited by examiner

LIGHT STICK HOLDING DEVICE FOR A FISHING FLOAT

The present invention relates generally to illuminated fishing floats or bobbers, and more specifically to fishing floats illuminated by chemiluminescent light sticks to provide visibility of the float at night and to visually signal its location and when a fish is caught.

BACKGROUND OF THE INVENTION

Fishing floats or bobbers are commonly used in fishing to control the depth at which a baited hook or lure is suspended and to indicate when a fish has taken the hook. When a fish takes the bait or lure, the attached bobber will move, alerting the fisherman to the presence of a fish on the line. Various conditions and types of fishing call for various sizes and types of bobbers. Specific types of floats or bobbers include foam, crappie, panfish and torpedo. Some floats are particularly adapted for night fishing by being equipped with lighting apparatus for improved visibility at night.

The advantages of night fishing have long been recognized since many species of fish feed well into the night or early in the morning before the sun rises. One example of a night feeding fish is the shovelhead catfish, a.k.a. flathead, yellow cat, and mudcat catfish. These catfish have a homesite where they rest during the day and from which they journey on their nocturnal feeding forays. A submerged stump, a hollow log, a bank den of muskrat or beaver, a pile of boulders or an undercut ledge is an excellent resting site for a shovelhead.

Trotline fishing is a means of assembling many lines at once for fishing, and keeping track of the lines can become a problem, especially at night. The absence of light during night fishing introduces problems which are not experienced during daylight fishing. For a trotline fisherman with many lines in the water, a float serves to indicate where a particular line is located. In addition to the difficulty of locating a float at night, often considerable difficulty is experienced seeing the movement of the float, so that is it difficult to determine if a fish is taking the bait or not. Consequently, previous inventions typically include some type of battery-powered light or fluorescent material attached to the bobber to provide a visual indication of its position during night fishing.

One of the difficulties with the prior art devices which provide light for floats is that some of the devices require bulky batteries to power a light bulb, while others require a unique and/or expensive style of bobber in which to hold the light. Electrical devices are vulnerable to short circuiting in the water, and many of the working parts will rust and cease to function. Floats which are specifically designed to hold chemiluminescent light capsules for night fishing often can only be used at night, and require the fisherman to purchase two sets of equipment, one for day fishing and one for night fishing.

Thus, there is a need for a device to assist the fisherman who is fishing at night to determine where the bobber or float is located. There is also a need for indicating movement of the bobber in the dark so that the night fisherman can recognize that a fish is biting. It would also be advantageous to provide an illumination device for a float that is not battery powered, is light weight, and has very few if any working parts. It would also be advantageous to provide a simple device that can be attached to an existing fishing float or bobber so that the fisherman can use the same equipment while fishing either during the day or at night. It is also desirable to provide a float or bobber that includes a side compartment for a chemiluminescent light to be easily placed so that the bobber can be used day or night. These and other features and advantages of the present invention will become more apparent with reference to the accompanying specification and claims.

SUMMARY OF THE INVENTION

The present invention provides a relatively simple and inexpensive device for illuminating a fishing float or the like for continuously indicating to a fisher the location of the float during nighttime fishing, and then visually signaling the fisher that a fish is taking the bait. The device is typically a small attachment to the side of a float that holds a disposable chemiluminescent light capsule and enables a user to replace the light capsule once the light energy in the capsule is spent without having to cut the fishing line.

The invention generally comprises a first side adapted to releasably attach the holding device to the fishing float, and a second side adapted to releasably attach the light stick to the holding device. Each of the first and second sides typically include a top portion, a middle portion and a bottom portion, and each of the top and bottom portions of the first side typically include a pair of gripping arms which are able to releasably receive a portion of the fishing float. Further, each of the top and bottom portions of the second side typically includes a pedestal which is able to releasably receive an end of the light stick. The pedestal of the top portion typically defines a ceiling pocket, and the pedestal of the bottom portion defines a floor pocket, and the ends of the light stick fit within these pockets. In general, the first and second sides are formed integrally with one another and are oriented so that they face away from one another.

While the nature and advantages of the present invention will be more fully appreciated from the following drawings and detailed description, showing the contemplated novel construction, combinations and elements as herein described, and more particularly defined by the appended claims, it is understood that changes in the precise embodiments of the present invention are meant to be included within the scope of the claims, except insofar as they may be precluded by the prior art.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

Figure 1:
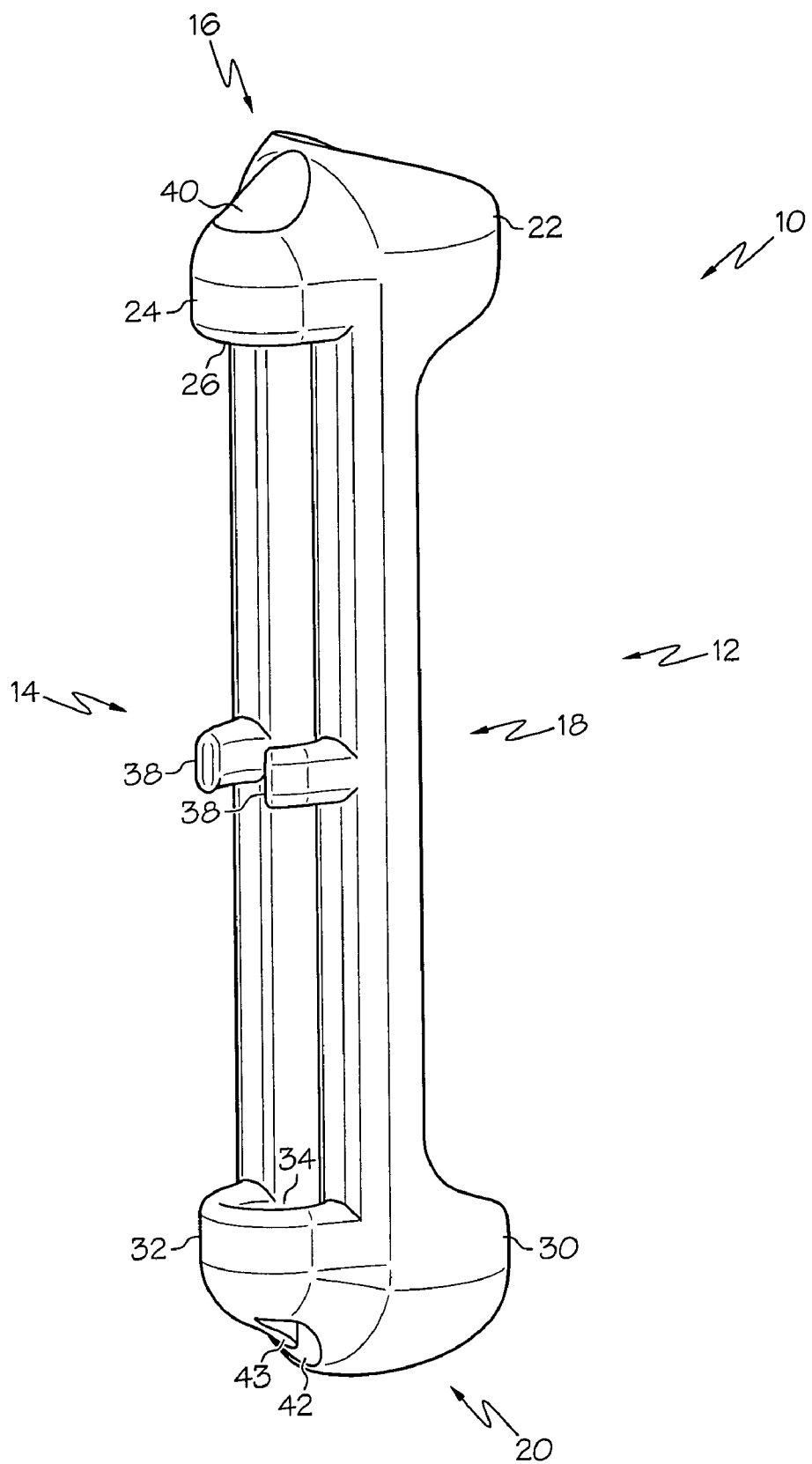
FIG. 1 is a perspective view of the holding device according to one embodiment of the present invention.

The present invention is generally a lightweight holding device for releasably attaching a chemiluminescent light stick capsule to a fishing float without impairing the action of the float. Referring to the drawings, FIG. 1 shows one embodiment of the holding device 10 of the present invention, which includes a first side 12 and a second side 14. Each side 12, 14 has a top portion 16, a middle portion 18 and a bottom portion 20. The top portion 16 includes a pair of gripping arms 22 extending outwardly from the first side 12, and a top pedestal 24 extending outwardly from the second side 14. The top pedestal 24 is dimensioned to define a ceiling pocket 26. The bottom portion 20 also includes a pair of gripping arms 30 extending outwardly from the first side 12, and a bottom pedestal 32 extending outwardly from the second side 14. The bottom pedestal is dimensioned to define a floor pocket 34. A pair of flank arms 38 are shown extending outwardly from the second side 14 of the holding device 10. These flank arms 38 are designed, along with pockets 26 and 34, to secure the light stick within the second side 14 of the holding device 10. The first side 12 is generally adapted to releasably attach the holding device 10 to a fishing float via the two pairs of gripping arms 22, 30. The second side 14 is generally adapted to releasably hold a chemiluminescent light stick within the holding device 10 via the two pockets 26, 34, and also via the flank arms 38. The first side 12 of the holding device 10 is typically concave in dimension to conform to a float having a convex outer surface, and the second side 14 is typically concave in dimension to conform to a chemiluminescent light stick having a convex outer surface.

Figure 2:
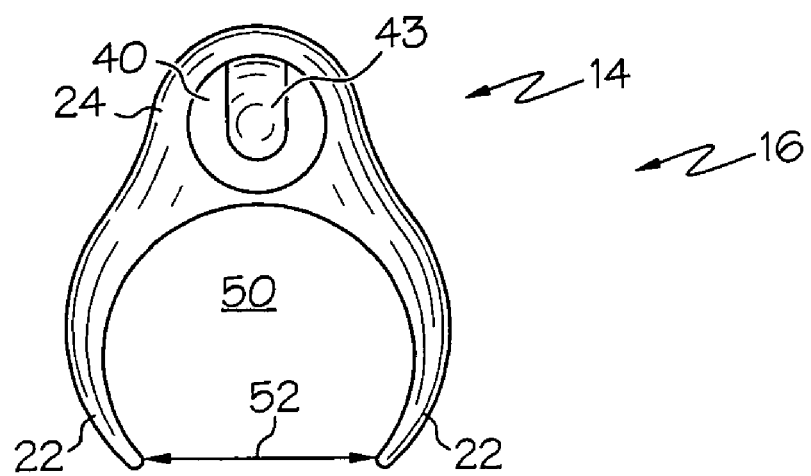
FIG. 2 is a top view of the holding device of FIG. 1.
Figure 3:
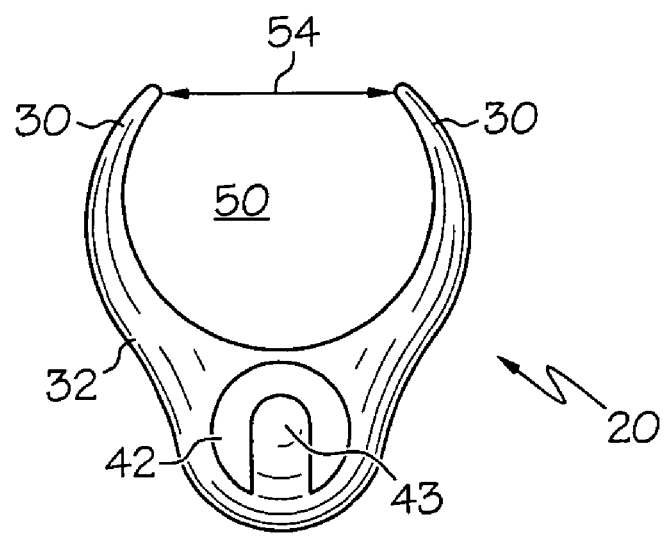
FIG. 3 is a bottom view of the holding device of FIG. 1.

Looking through the top 16 of the holding device in FIG. 2, the top gripping arms 22 define a channel 50 in which the float will sit. The float reaches this channel 50 by passing through an opening 52 between the gripping arms 22. Portal 40, located within the top pedestal 24, allows a chemiluminescent light stick to be inserted by the user through the pedestal 24. FIG. 3 illustrates the channel 50 as viewed through the bottom 20 of the holding device. Gripping arms 30 define the channel 50 for the float, and the opening 54 created by the gripping arms 30 allows passage of the float into the channel. A flexible slit 42 with a flange 43 sitting therein is located within the bottom pedestal 32. The slit 42 permits the light stick to be pushed out through the pedestal 32 when the light stick is expended, while the flange 43 keeps the light stick from inadvertently falling through the bottom of the pedestal 32 prematurely.

Although convenient for the user, the portal 40 and the flexible slit 42 with flange 43 are optional aspects in this embodiment of the device. The light stick is typically adequately secured within the pockets 26, 34, and easily dislodged from the pedestals 24, 32 of the holding device. In embodiments where the portal 40 is not present, the light stick is snapped into place between the pedestals 24, 32 and fitted within the pockets 26, 34 of the second side 14, since there is no portal 40 to slide the stick through. If the flexible slit 42 is not present within the bottom pedestal 32, then the expended light stick can be removed by gently snapping the light stick out from between the pedestals 24, 32. In one embodiment the pedestals 24, 32 can be flexible in construct to allow more ease in snapping the light stick in to and out of the holding device.

Figure 4:
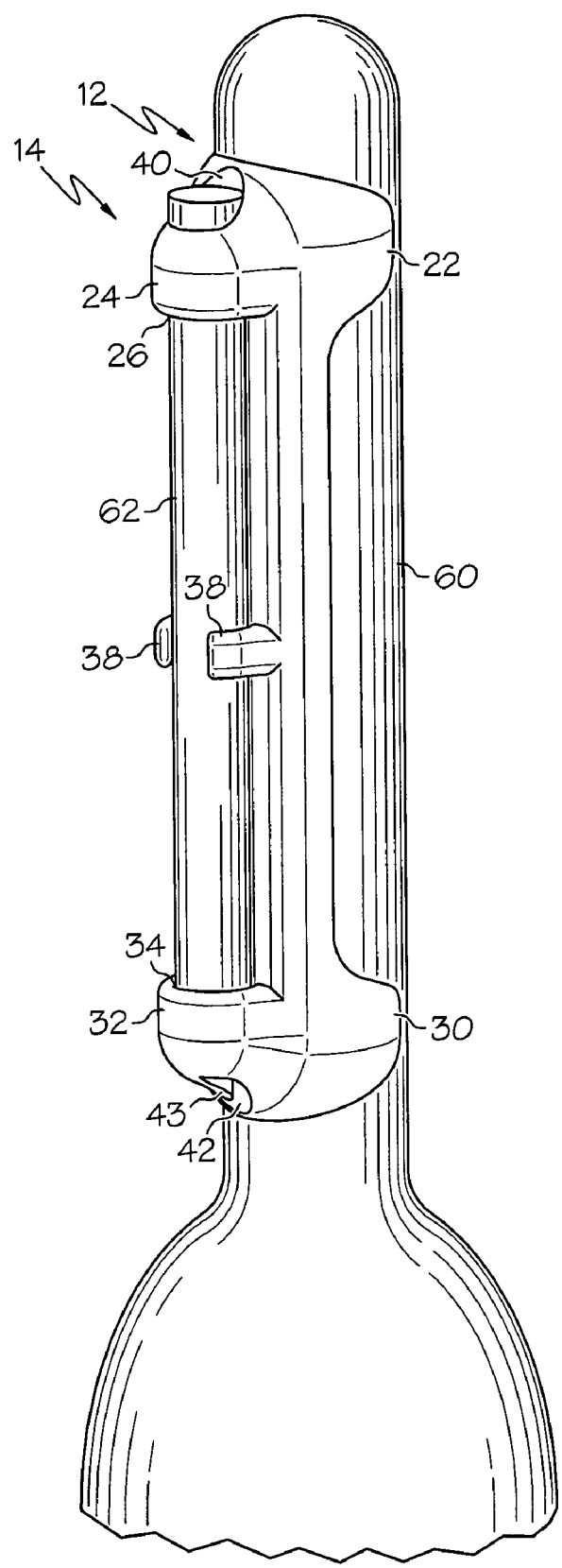
FIG. 4 is a perspective view of one embodiment of the holding device of the present invention attached to a float and containing a light stick.

FIG. 4 illustrates the holding device 10 mounted onto an elongated fishing float 60, typically known as a torpedo float, via its first side 12. The top and bottom pairs of gripping arms 22, 30, respectively, secure the holding device onto the body of the fishing float 60. A chemiluminescent light stick 62 is mounted within the pockets 26, 34 formed by the pedestals 24, 32, respectively, extending from the second side 14 of the holding device. Flank arms 38 help to secure the light stick 62 within the holding device at the middle portion. The chemiluminescent light stick 62 extends parallel to the vertical axis of fishing float. In use, the light stick 62 is inserted through the portal 40 of the device and sits within the pockets 26, 34 and between the flank arms 38. The stick 62 can then be removed from the device by being pushed through the slit 42 when the light in the stick is expended. Flange 43 keeps the stick 62 within the floor pocket 34 of the bottom pedestal 32. Flange 43 is part of the slit 42, and prevents the stick 62 from inadvertently sliding out through the slit 42 during use. However, the flange 43 portion of the slit 42 is typically flexible to allow passage of the stick 62 upon the application of gentle pressure on the stick 62 by the user along the vertical axis of the stick from above.

When the holding device 10 is attached to the float 60, the weight of the chemiluminescent light stick 62 typically causes the float 60 to lean slightly to one side. In practice, the stick 62 can be attached to the float 60 via the device 10 such that it leans toward the shore, and chemiluminescent light is visible to a viewer fishing in the dark or under low light conditions. As shown in FIG. 4, the gripping arms 22, 30 are typically tapered away from the middle of the device, in a manner which will permit a smoother, more aerodynamic fit. Alternatively, the gripping arms 22, 30 can fit onto the float in a direction 90 degrees from the vertical plane of the float. While a torpedo float is illustrated in FIG. 4, the holding device of the present invention is not limited to attachment to this type of float, and can be designed to fit any type of float that protrudes out of the water, for example, but not limited to, foam, crappie, panfish and torpedo floats.

Chemiluminescent light sticks are known in the art and are commercially available as cylindrical, closed-end sticks or capsules that contain an external chamber and a crushable internal chamber. One such chemiluminescent light stick is sold under the trademark CYALUME® by the American Cyanamid Company. Chemiluminescent light sticks are described, for example, in U.S. Pat. Nos. 3,597,362 and 3,539,794. The internal chamber is breakable by a user so that a first chemical may be allowed to migrate into the confines of the outside chamber to react with a second chemical to chemically drive a reaction forming a chemiluminescent light emission. When the internal chamber is crushed the chemical mixture emits light for several hours. The light generated is achieved without the aid of batteries and bulbs and solely within the confines of a closed capsule, making it suitable for use with fishing floats. The chemiluminescence materials are sealed within the capsule and will not pollute the fishing waters or provide a scent that might scare fish away.

Figure 5:
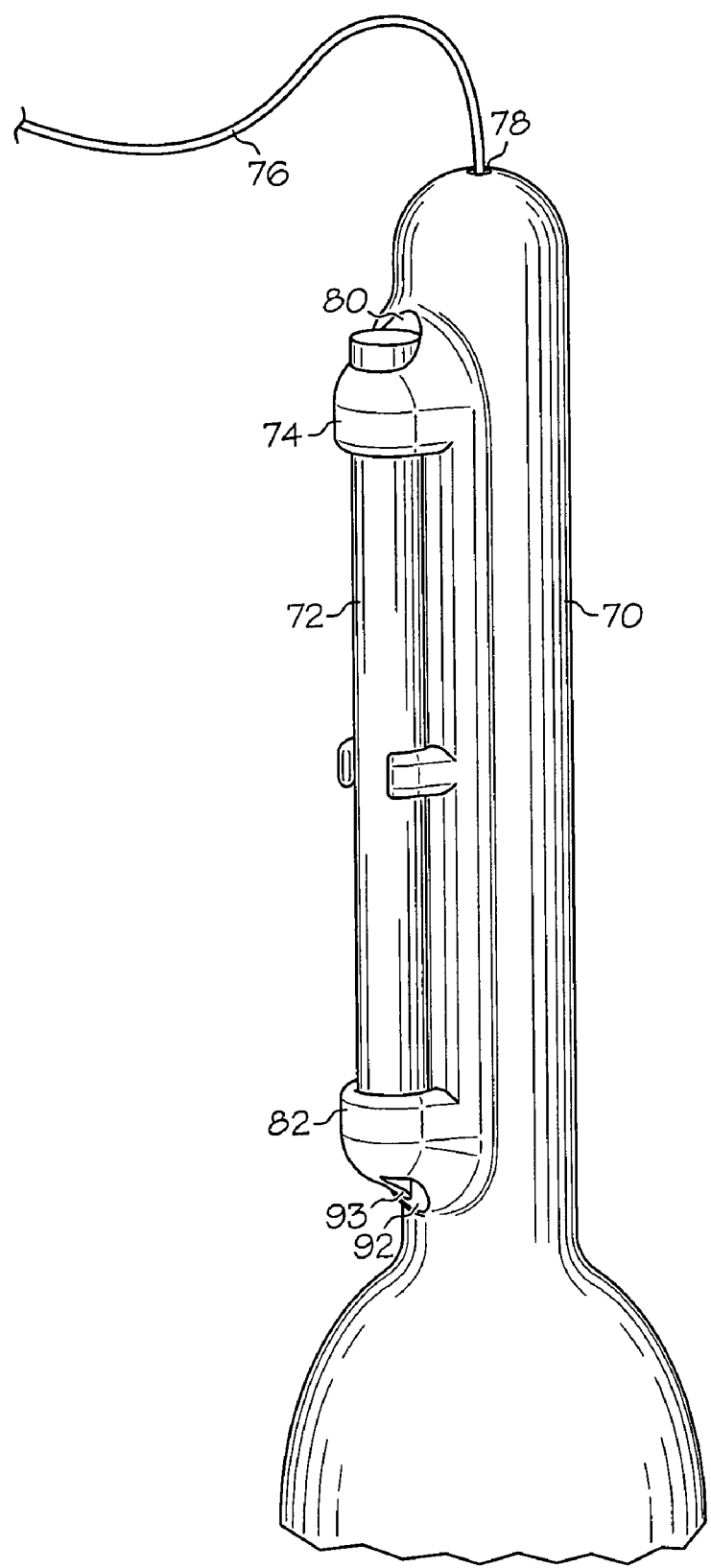
FIG. 5 is a perspective view of one embodiment of the present invention in which the holding device is incorporated into the structure of a torpedo float.

FIG. 5 shows an alternative embodiment of the present invention in which the top pedestal 74 and bottom pedestal 82 are integrated into the frame of a fishing float 70 as a side compartment. The chemiluminescent light stick 72 extends parallel to the vertical axis of the float 70, and can be inserted into the side compartment of the float 70 through portal 80. In use, as described above, the weight of the chemiluminescent light stick 72 causes the float to lean slightly to one side, and preferably towards the user. With this configuration, the chemiluminescent light is typically visible to a user fishing in the dark or under low light conditions. In FIG. 5, a fishing line 76 is shown extending through a slot 78 in the float, such that the light stick 72 can be removed from the float 70 without having to cut the line 76. Such a slot 78 is well-known in the art. In addition, a flexible slit 92 with a flange 93 are included to permit easy removal of the light stick 72 after its light is expended.

Figure 6:
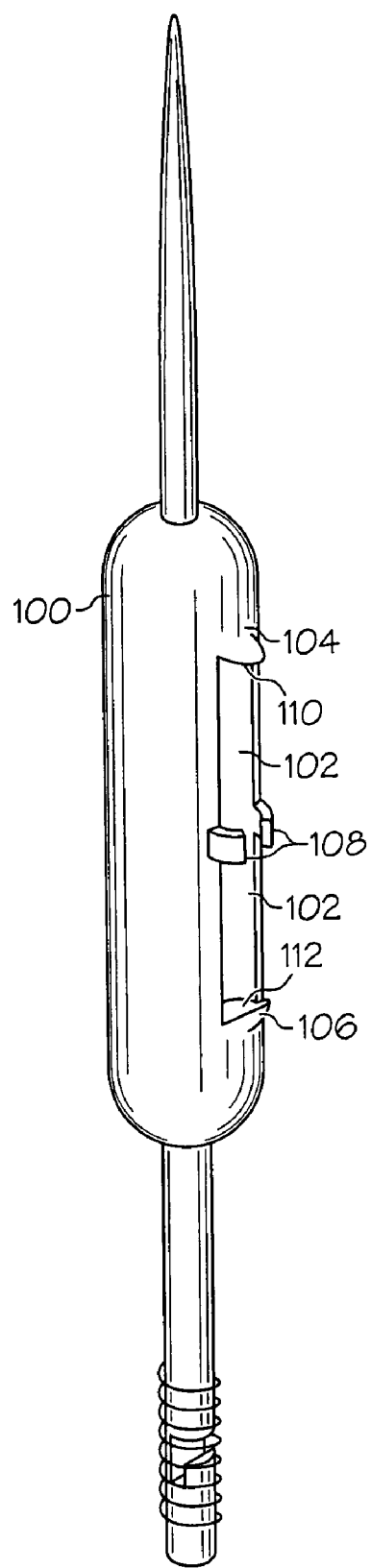
FIG. 6 is a perspective view of one embodiment of the present invention in which the holding device is incorporated into the structure of a crappie float.

FIG. 6 illustrates another embodiment of a fishing float 100 with a holding device integrated therein as a side compartment 102, according to the present invention. The side compartment 102 includes a top pedestal 104 and a bottom pedestal 106, along with a ceiling pocket 110 and a floor pocket 112. Further, flank arms 108 are incorporated into the side compartment 102 of the float 100. Generally, the side compartment 102 is dimensioned to releasably secure a chemiluminescent light stick therein. The top and bottom pedestal 104, 106 of the side compartment 102 typically extend outwardly from the inner surface of the compartment, with the outer terminations of each of the pedestals 104, 106 adapted to releasably hold an end of the light stick by forming pockets 110, 112. Pockets 110, 112 are dimensioned to releasably fit an end of the light stick therein, with the top pedestal 104 defining the ceiling pocket 110 and the bottom pedestal 106 defining the floor pocket 112. While the fishing float depicted in FIG. 6 includes pockets within the pedestals, the pedestals can be manufactured such that they are simple tabs without pockets, such that the light stick will simply snap into place between the tabs.

Since the attachable holding device of the instant invention is light in weight it will obviate problems with damping or inertia associated with more massive holding devices. Moreover, the attachable holding device of the instant invention will allow a user to modify an existing fishing bobber or float for night fishing without having to carry out extensive modifications to it. Still further, since the instant invention does not impart the weight and other disadvantages of electrically illuminated fishing floats, the invention allows the user to use the same float during the day or night, thus reducing the number of fishing floats that a fisherman needs to own.

Regarding the embodiment in which the holding device is integrated into the float, the float is intended to perform the same as any similar float not having a side compartment, and is typically lightweight and made of a one-piece construction. One can mount the chemiluminescent light stick directly in to the float without impairing the action of the float, other than to cause it to bob to one side (i.e. towards the shore) when the light stick is inserted therein. In all embodiments of the invention, the light weight of either the holding device or the float-with-holding-device does not interfere with the feel of the line as a person reels in the fishing line. Further, the sides of the device or float which engage the chemiluminescent light stick are typically concave in dimension to conform to a light stick having a convex outer surface.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. Accordingly, departures may be made from such details without departing from the scope or spirit of the invention.

What is claimed is:

1. A holding device for releasably securing a chemiluminescent light stick to a fishing float that is configured to protrude from the water, the device being constructed of a light weight, resilient and flexible material and comprising:

a first side adapted to be releasably secured to a protruding portion of the fishing float;

a second side formed integrally with and oriented to face away from the first side, the second side adapted to releasably hold a chemiluminescent light stick;

a top portion comprising top gripping arms and a top pedestal, the top gripping arms extending outwardly from the first side, the top pedestal extending outwardly from the second side, the outer termination of the top pedestal defining a ceiling pocket dimensioned to releasably hold a first end of the light stick therein;

a middle portion comprising flank arms extending outwardly from the second side; and a bottom portion comprising a pair of bottom gripping arms and a bottom pedestal, the bottom gripping arms extending outwardly from the first side, the bottom pedestal extending outwardly from the second side, the outer termination of the bottom pedestal defining a floor pocket dimensioned to releasably hold a second end of the light stick therein.

2. The holding device of claim 1, wherein the outer terminations of the top and bottom gripping arms define an opening dimensioned to releasably receive the protruding portion of the fishing float therethrough.

3. The holding device of claim 1, wherein the ceiling pocket comprises a portal dimensioned to receive the chemiluminescent light stick therethrough.

4. The holding device of claim 1, wherein the floor pocket comprises a slit including a flexible flange adapted to allow the light stick to be pushed out therethrough when the chemiluminescence of the light stick is expended.

5. The holding device of claim 1, wherein the first side is concave in dimension to conform to a float having a convex outer surface, and the second side is concave in dimension to conform to a chemiluminescent light stick having a convex outer surface.

6. The holding device of claim 1, further including an elongated cylindrical chemiluminescent light stick for providing illumination, the light stick having a first end and a second end.

7. In a fishing float that is configured to protrude from the water, a side compartment dimensioned to releasably secure a chemiluminescent light stick therein, the side compartment being integral to a protruding portion of the fishing float and comprising:

a top portion comprising a top pedestal extending outwardly from the side compartment, the outer termination of the top pedestal defining a ceiling pocket dimensioned to releasably hold a first end of the light stick therein;

a middle portion comprising flank arms extending outwardly from the side compartment; and a bottom portion comprising a bottom pedestal extending outwardly from the side compartment, the outer termination of the bottom pedestal defining a floor pocket dimensioned to releasably hold a second end of the light stick therein.

8. The float of claim 7, further including an elongated cylindrical chemiluminescent light stick for providing illumination.

9. The float of claim 7, wherein the pedestals of the side compartment are contiguous with the outer surface of the float.

10. The float of claim 7, wherein ceiling pocket comprises a portal dimensioned to receive the chemiluminescent light stick therethrough.

11. The float of claim 7, wherein the floor pocket comprises a slit including a flexible flange adapted to allow the light stick to be pushed out therethrough when the chemiluminescence of the light stick is expended.

12. The float of claim 7, wherein the flank arms are constructed of a flexible material.

13. The float of claim 7, wherein the pedestals are constructed of a flexible material.

14. The float of claim 7, wherein the side compartment has an inner surface that is concave in dimension to conform to a chemiluminescent light stick having a convex outer surface.

* * * * *

UNITED STATES PATENT AND TRADEMARK OFFICE
CERTIFICATE OF CORRECTION

| | | |
|---|---|---|
| PATENT NO. | : 7,100,323 B1 | Page 1 of 1 |
| APPLICATION NO. | : 11/064210 | |
| DATED | : September 5, 2006 | |
| INVENTOR(S) | : Ricardo D. Boggess | |

It is certified that error appears in the above-identified patent and that said Letters Patent is hereby corrected as shown below:

On the title page, item [76]:
Under Inventor, delete "Ricardo D. Bogess" and insert --Ricardo D. Boggess--.

Signed and Sealed this

Fifth Day of December, 2006

JON W. DUDAS
*Director of the United States Patent and Trademark Office*